Sept. 2, 1924.  1,507,378
D. F. HORMANN
HOMOGENIZING VALVE
Filed Feb. 19, 1924
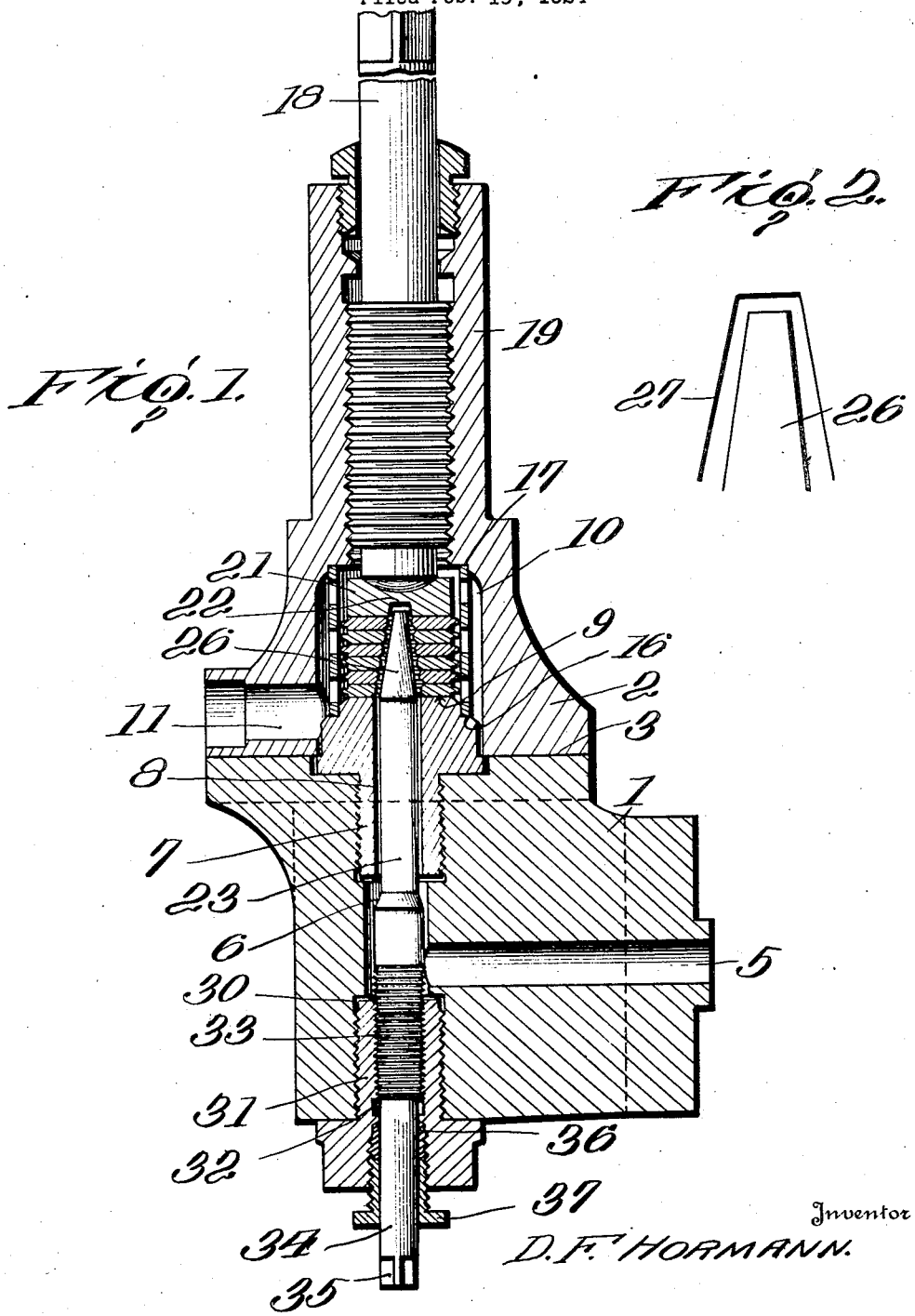
Inventor
D. F. HORMANN.
By
Sturtevant + Mason Attorneys Patented Sept. 2, 1924.

1,507,378

UNITED STATES PATENT OFFICE.

DIEDRICH F. HORMANN, OF OKLAHOMA CITY, OKLAHOMA, ASSIGNOR OF ONE-HALF TO E. F. COMEGYS, OF OKLAHOMA CITY, OKLAHOMA.

HOMOGENIZING VALVE.

Application filed February 19, 1924. Serial No. 693,808.

*To all whom it may concern:*

Be it known that I, DIEDRICH F. HORMANN, a citizen of the United States, residing at Oklahoma City, in the county of Oklahoma, State of Oklahoma, have invented certain new and useful Improvements in Homogenizing Valves, of which the following is a description, reference being had to the accompanying drawing, and to the figures of reference marked thereon.

This invention relates to homogenizing valves for milk and other fluids, and more particularly to certain improvements in the construction disclosed in my Patent #1,451,393, granted April 10, 1923.

One of the objects of the present invention resides in constructing a valve of this type so that a much finer adjustment can be had of the means for controlling the feeding of the milk or fluid to the homogenizing passages.

Another feature of the invention resides in the provision of a construction whereby the feed of the milk to the homogenizing passages can be regulated or adjusted while the valve is in operation without disturbing any of the set parts of the valve.

These and other objects will be apparent from a perusal of the following specification when taken in connection with the accompanying drawings, wherein—

Figure 1 is a sectional view of the entire valve, and

Fig. 2 is a diagrammatic view showing the relation between the taper of the annuli and the taper of the concentrically arranged pin.

Referring now to the drawings in detail, it will be seen that the valve in general aspects is similar in construction to that of my prior patent heretofore mentioned. The improved valve comprises a casing including a lower section 1 and an upper section 2. As in my prior patent, these sections are joined together along the intermediate line 3 by a series of bolts, not shown, thereby providing a valve easily disassembled for cleaning purposes. The lower section is provided with a liquid entrance 5 which extends transversely through one side thereof and terminates in a substantially vertical bore 6, the upper face of which is somewhat enlarged to receive a threaded plug 7 having a central milk passage 8, which constitutes a continuation of the passage 6. The upper face of this threaded plug 7 is suitably ground to provide a valve seat 9. The upper portion 2 of the valve casing is provided with an enlarged chamber 10 which surrounds the uppermost portion of the plug 7 and valve seat 9. This chamber 10 is of relatively large dimensions to accommodate the homogenizing elements, which in the present instance, consist of a stack or series of homogenizing disks of any desired shape or size. In the present instance, these disks are illustrated in the form of annuli which are superimposed upon the valve seat 9. At one side, the chamber 10 emerges into a milk discharging outlet 11 which passes through the lower side of the portion 2 of the casing.

The homogenizing annuli have their central openings concentrically registering with the central axis of the milk passage 8 of the central plug 7. These annuli, as in the construction of my prior patent, are preferably beveled on their inner faces to provide an easy ingress of the milk between the ground flat juxta-posed surfaces of the annuli. Preferably, the inner wall of each of these annuli or disks are beveled toward the flat face. So also, the annuli are provided with the radial spacing lugs described in my prior patent for centering the perforate sleeve 15 which is clamped between the shoulder 16 on the upper face of the plug 7 and the shoulder 17 on the inner upper wall of chamber 10. The inner wall of this centering sleeve fits practically the outer perforate faces of the lugs 14 so that when the disks are in position, the centering sleeve maintains them concentrically about the milk passage 8. As shown, the sleeve is suitably perforated to permit the passage of the milk discharging therethrough. In addition, these perforations may thoroughly break up and emulsify the milk as it discharges therefrom.

The homogenizing disks are clamped together and to the seat 9 by means of the valve stem 18. This valve stem threads through the upper elongated sleeve 19 which is a part of the upper portion 2 of the valve casing. The lower portion of this stem 18 is provided with a round ball-like surface 20 which fits within a concavity in the top of the upper valve disk 21, which is preferably much thicker than the other valve disks, and of course, has no opening therethrough, the same being slightly recessed as at 22 to permit sufficient passage of milk to the joint between these disks and the lower adjacent valve disk. This ball joint between the valve stem 18 and the upper disk gives a universal adjustment of the valve disk so that there can be no irregular openings between the disks even if the same are not as thick on one side as they are on the other, provided the faces of the disks are true and straight. This construction just described is shown in my prior patent.

The novel features of the present invention relate to the construction and arrangement of the homogenizing annuli and also to the central pin which controls the feed of the milk to the homogenizing passages between the annuli. In my prior patent, the annuli were provided with central bores of uniform diameter, whereas, in the present instance, the bore of each annuli comprising the stack or column is progressively enlarged from top to bottom of the stack so as to provide a tapered opening, which in cross section resembles the frustrum of a cone. This tapered recess constitutes the milk passage leading the homogenizing openings between the juxtaposed faces of the annuli. Cooperating with the tapered wall of the bore, the annuli are provided with means for causing the liquid or milk to flow between all of the homogenizing disks. In the present instance, this means comprises a distributing or pressure pin 23 which extends longitudinally and centrally of the milk channel 6, and at its inner upper end is provided with a taper which progressively decreases from bottom to top as illustrated at 26. Particular attention is drawn to the fact that the taper of this pin varies slightly from the taper of the inner bore of the annuli, that is, the inner wall formed by the bores of the stack of annuli, is not parallel with the outer tapered wall of the upper portion 26 of this pin. Figure 2 of the drawings brings out more clearly this relation of parts, it being apparent that if the line 27 which illustrates the inner wall of the stack of annuli were extended upwardly, it would meet the line 26' which illustrates the exterior taper of the upper portion 26 of the pin at some point beyond the top of the sheet of drawings. The taper of these two surfaces is so proportioned that upon proper adjustment, the pin will permit only such volume of milk or other liquid to flow between it and the inner wall of the annuli as can be accommodated by and efficiently homogenized between any two disks, or between any one or more homogenizing passages between the disks.

The operation of the construction herein disclosed is similar to that of my prior patent, except that by tapering the inner wall formed by the central bore of the stack of annuli, and the central pin, and arranging these tapers at an angle as illustrated in Fig. 2, a much finer adjustment of the milk passage between the annuli and the pin can be secured on adjustment of the pin itself.

Another novel feature of the invention as distinguished from the construction set forth in my prior patent consists in the manner in which the pin 23 is mounted in the casing 1. In my prior construction, no particular provision was made for adjusting the valve stem while the valve was in operation, although the valve could be adjusted by removing the member on which the valve was carried. In the present construction, however, an arrangement is presented which permits an adjustment of the valve stem from the exterior of the valve, and while the valve is in operation. Such a construction provides a very advantageous feature, because its immediate effect on the milk can be determined by microscopic examination, and the correct setting of the valve thereby ascertained. To this end, the casing 5 is provided with a bore 30 into which threads a plug 31. This plug in turn is provided with a central threaded bore 32, the thread of which is relatively fine to fit the corresponding thread 33 on the lower part of the valve stem 23. This relatively fine thread permits a desired minute adjustment of the valve stem 23 relatively to the homogenizing annuli. The lower portion of the valve stem 23 projects outwardly through the bore of plug 31 as at 34, where it is provided with a turning end 35. The outer joint between the plug 31 and stem 34 of pin 23 is suitably packed as at 36 with a threaded plug 37 which effectively prevents the escape of milk between the plug 31 and the stem 34.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A homogenizing valve comprising means forming a gradually sloping surface provided with a series of homogenizing passages, a second means forming a sloping surface opposite and slightly spaced from said first surface, and means to vary the distance between said surfaces.

2. A homogenizing valve comprising a stack of annuli having central openings of gradually varying diameters to form a tapering fluid passage, a pin having a tapering end arranged concentrically within said annuli, and means to adjust said pin longitudinally.

3. A homogenizing valve comprising a stack of annuli having central openings of gradually varying diameters to form a tapering fluid passage, a pin having a tapering surface, which surface is disposed at an angle to the taper of said fluid passage, and means to adjust the distance between said surfaces.

4. A homogenizing valve comprising means provided with lateral openings forming homogenizing passages, said means having a liquid passage therein in the shape of a frustrum of a cone, and a tapered distributing pin concentrically disposed within said passage.

5. A homogenizing valve comprising means provided with lateral openings forming homogenizing passages, said means having a liquid passage therein in the shape of a frustrum of a cone and a tapered distributing pin disposed within said passage, the taper of said pin being variant from the taper of the conical wall of said means.

6. A homogenizing valve comprising a recessed casing, juxta-posed annuli forming a central liquid passage and homogenizing passages between the faces of the annuli, a tapered distributing pin concentrically disposed in said liquid passage, said pin having an extension projecting outside of said casing.

7. A homogenizing valve comprising a recessed casing, a stack of homogenizing annuli mounted therein, a threaded plug mounted in said casing and housing a centrally threaded bore, a pressure pin mounted in the bore of said plug and having threads engaging the threads of said bore, said pin having a tapered portion extending outside of said casing for turning said pin.

In testimony whereof I affix my signature.

DIEDRICH F. HORMANN.